Patented June 20, 1944

2,352,078

UNITED STATES PATENT OFFICE 2,352,078

INSECTICIDAL COMPOSITION

Gerald H. Coleman and Clarence L. Moyle, Midland, Mich., assignors to The Dow Chemical Company, Midland, Mich., a corporation of Michigan No Drawing. Application July 27, 1940,
Serial No. 348,010

6 Claims. (Cl. 167—30)

This invention relates to insecticidal compositions and is particularly concerned with spray and dust materials adapted for combating flies, mosquitos, and common agricultural insect pests.

Extracts of such insecticidal plant products as pyrethrum flowers, derris, cube, timbo, barbasco, and the like are widely used for the control of insect pests.

These toxicants are generally employed as constituents of dusting mixtures, in petroleum distillate sprays, or in aqueous dispersion. Pyrethrin-containing compositions have quick paralyzing action on flies and other insects but give a relatively low kill as compared to the per cent knockdown. With rotenone, a high "moribund" kill is generally obtained, although a considerable period of time is required to destroy insect pests. The plan extracts generally are unstable to light and heat and lose their effectiveness to a considerable degree upon storage.

We have discovered that certain thio-ether compounds are effective substitutes for extracts of insecticidal plant products. This group of compounds is characterized by the following formula

R—S—(C$_n$H$_{2n}$—O)$_m$—C$_n$H$_{2n}$—X wherein R represents a cyclic organic radical selected from the group consisting of aromatic, alicyclic, and heterocyclic radicals, X represents chlorine or R—S—, $n$ is an integer from 2 to 4, inclusive, and $m$ is an integer not greater than 3. These compounds are more stable to heat, light, and air than are pyrethrin and rotenone. Dust and spray compositions containing these compounds as sole toxic ingredients compare favorably in insecticidal efficiency with analogous compositions comprising the plant extracts. Furthermore, small amounts of the thio-ethers may be used to fortify compositions comprising insecticidal plant products whereby improved insecticidal materials are obtained which are more stable to heat and light and have a greater paralyzing effect and greater lethal effect on insects than do the original extract-containing compositions. By employing these ether compounds to fortify and supplement the action of such known insecticidal materials, an increased efficiency is obtained and economies in the amounts of pyrethrin and rotenone required are effected.

When the thio-ethers are used alone, a concentration of from about 2 to 10 per cent by weight in the spray or dusting composition is satisfactory. For use in fortifying compositions comprising pyrethrins or rotenone, the ether compound is preferably employed in amount of from about 0.5 to 5 grams per 100 grams of the composition.

The thio-ethers with which the present invention is concerned are conveniently prepared by reacting the dichloropolyalkyl ethers with the thiophenols, thiocycloalkanols, and heterocyclic mercaptans in the presence of aqueous sodium hydroxide. In carrying out this reaction an excess of the dichloro ether is reacted with substantially equimolecular proportions of the caustic and sulfur-containing compound. The various reactants are mixed with water and heated to a reaction temperature generally between about 90° and 125° C. with stirring. When the reaction is complete, the mixture is cooled, washed with water, and the desired compounds obtained by fractionally distilling or by other method of separation. If desired the oily product of reaction can be separated from the reaction mixture by decantation and used for insecticidal purposes directly or after unreacted dichloro-ether has been removed by distillation. Both the mono- and di-substituted derivatives of the dichloro-polyalkyl ether are generally produced in the reaction. The mono-substitution product is obtained in good yield when appreciable excesses of the dichloro ether are employed.

The method employed in determining the insecticidal toxicity of the spray compositions disclosed in certain of the following examples is substantially that described in Soap 8, No. 4, 1932, and known as the Peet-Grady method. For purpose of comparison a pyrethrin solution consisting of the extractable toxicants from one pound of pyrethrin flowers dissolved in one U. S. gallon of a petroleum distillate having a boiling range of 345°–508° F. and a flash point of 137° F. was employed as a control.

The following examples are purely illustrative and are not to be construed as limiting:

EXAMPLE 1

2.5 grams of beta-(2-benzothiazylthio)-beta'-chloro-diethyl ether, boiling at 205°–208° C. at 4 millimeters pressure, was dissolved in 100 milliliters of the petroleum distillate as employed in the control insecticide. This solution was thereafter employed as a spray composition against 3-day old house flies according to the Peet-Grady method and found to give a knockdown of 63 per cent in 10 minutes and a kill of 44 per cent in 48 hours.

In similar determination beta-(phenylthio)-beta'-chloro-diethyl ether, boiling at 125°–130° C.

at 2 millimeters pressure and having a specific gravity of 1.173 at 20°/4° C., gave a knockdown of 61 per cent in 10 minutes and a kill of 22 per cent in 48 hours; beta-beta'-di-(phenylthio)-diethyl ether, boiling at 190°-200° C. at 2 millimeters pressure and having a specific gravity of 1.152 at 20°/4° C., gave a knockdown of 76 per cent in 10 minutes and a kill of 61 per cent in 48 hours; and beta-(4-methyl-phenylthio)-beta'-chloro-diethyl ether, boiling at 168° C. at 8 millimeters pressure and having a specific gravity of 1.133 at 25°/4° C. gave a knockdown of 94 per cent in 10 minutes and a kill of 57 per cent in 48 hours.

In control determinations the pyrethrin-containing control solution gave an average knockdown of 99 per cent in 10 minutes and a kill of 53 per cent in 48 hours.

Example 2

The control pyrethrin composition was employed to prepare fortified fly spray mixtures in which the synthetic thio-ethers were incorporated as a supplementary toxicant. The control solution gave a knockdown of 99 per cent in 10 minutes and a kill of 36 per cent in 48 hours.

50 milliliters of this control solution was diluted with 50 milliliters of petroleum distillate, and 2.5 grams of beta-beta'-di-(phenylthio)-diethyl ether dissolved therein. When tested according to the Peet-Grady method, this composition gave a knockdown of 99 per cent in 10 minutes and a kill of 82 per cent in 48 hours.

A similar composition in which beta-(2-benzothiazyl-thio)-beta'-chloro-diethyl ether was employed as the addition agent, gave a knockdown of 99 per cent in 10 minutes and a kill of 61 per cent in 48 hours.

Example 3

The new group of toxicants may also be employed in aqueous dispersion for the control of such insects as the Colorado potato beetle, poplar aphis, and the like. A representative composition is as follows:

Composition A

| | |
|---|---:|
| Beta-(6-tertiarybutyl-2-benzothiazylthio)-beta'-chloro-diethyl ether ____pounds__ | 3 |
| Diatomaceous earth_____do____ | 12 |
| Sodium-lauryl-sulfate_____do____ | 0.5 |
| Water_____gallons__ | 100 |

Dust compositions adapted to be employed for the control of pea-aphis have the following composition:

Composition B

Parts by weight

| | |
|---|---:|
| Beta-(4-tertiarybutyl-phenylthio)-beta'-chloro-dipropyl ether_____ | 1.5 |
| Derris resins_____ | 0.5 |
| Walnut shell flour_____ | 98.0 |

Composition C

Parts by weight

| | |
|---|---:|
| Delta-delta'-di-(2.4.6-trichloro-phenylthio)-dibutyl ether_____ | 3 |
| Diatomaceous earth_____ | 97 |

Composition D

Parts by weight

| | |
|---|---:|
| Beta-(1-naphthylthio)-beta'-(2-chloro-ethoxy)-diethyl ether_____ | 3.5 |
| Red talc_____ | 96.5 |

Composition E

Parts by weight

| | |
|---|---:|
| Beta-(cyclohexylthio)-beta'-chloro-diethyl ether_____ | 1 |
| Beta-(4-tertiarybutyl-phenoxy)-beta'-thio-cyano-diethyl ether_____ | 1 |
| Diatomaceous earth_____ | 98 |

Among other compounds which may be similarly employed are beta-(6-chloro-2-benzothiazylthio)-beta'-chloro-diethyl ether, beta-beta'-di-(2-benzothiazylthio)-diethyl ether, beta-(6-phenyl-2-benzothiazylthio)-beta'-chloro-diethyl ether, gamma-(6-cyclohexyl-2-benzothiazylthio)-gamma'-chloro-dipropyl ether, beta-(2-benzothiazylthio)-beta'-(2-chloro-ethoxy)-diethyl ether, beta-(2-phenylthioethoxy)-beta'-(2-chloroethoxy)-diethyl ether, delta-delta'-di-(4-chloro-2-methyl-phenylthio)-dibutyl ether, beta-(3-methyl-cyclohexylthio)-beta'-chloro-diethyl ether, beta-(3-mercapto-5-thiadiazylthio)-beta'-chloro-diethyl ether, beta-(1-phenyl-5-tetrazylthio)-beta'-chloro-diethyl ether, beta-(2-allyl-amino-5-thiadiazylthio)-beta'-chloro-diethyl ether, beta-(4-oxo-2-thiazylthio)-beta'-chloro-diethyl ether, beta-5-cyclohexylidene-4-oxo-2-thiazylthio)-beta'-chloro-diethyl ether, beta-(2-benzimidazolylthio)-beta'-chloro-diethyl ether, etc.

The new thio-ethers with which the present invention is concerned may be used also as toxicants in emulsions and in combination with soap or other wetting, emulsifying, or detergent agents. Various perfumes or coloring agents may be employed therewith if desired. Besides petroleum distillates, other organic solvents such as benzene, ethylene chloride, hydrogenated naphthalene, butyl alcohol, ketones, etc. may be employed. The phrase "non-corrosive organic solvent" as employed in certain of the following claims refers to any organic solvent material unreactive with and capable of dissolving the toxicants described, and non-injurious to the skin and general health of humans.

We claim:

1. An insecticidal composition comprising as an active toxicant from 0.5 to 10 per cent by weight of a compound having the formula

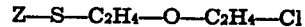

$$Z-S-C_2H_4-O-C_2H_4-Cl$$

wherein Z represents a heterocyclic radical.

2. An insecticidal composition comprising as an active toxicant from 0.5 to 10 per cent by weight of a compound having the formula

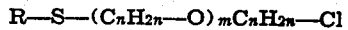

$$R-S-(C_nH_{2n}-O)_mC_nH_{2n}-Cl$$

wherein R represents a cyclic organic radical selected from the group consisting or aromatic, alicyclic, and heterocyclic radicals and in which any halogen substituents which may be present are attached directly to nuclear carbon atoms, n is an integer from 2 to 4, inclusive, and m is an integer not greater than 3.

3. An insecticidal composition comprising as an active toxicant from 0.5 to 10 per cent by weight of a compound having the formula

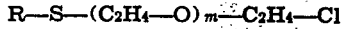

$$R-S-(C_2H_4-O)_m-C_2H_4-Cl$$

wherein R represents a cyclic organic radical selected from the group consisting of aromatic, alicyclic, and heterocyclic radicals and in which any halogen substituents which may be present are attached directly to nuclear carbon atoms, and m is an integer not greater than 3.

4. An insecticidal composition comprising as an active toxicant from 0.5 to 10 per cent by weight of a compound having the formula $$R-S-C_nH_{2n}-O-C_nH_{2n}-Cl$$

wherein R represents a cyclic organic radical selected from the group consisting of aromatic, alicyclic, and heterocyclic radicals and in which any halogen substituents which may be present are attached directly to nuclear carbon atoms, and $n$ is an integer from 2 to 4, inclusive.

5. An insecticidal composition comprising as an active toxicant from 0.5 to 10 per cent by weight of a compound having the formula $$R-S-C_2H_4-O-C_2H_4-Cl$$

wherein R represents a cyclic organic radical selected from the group consisting of aromatic, alicyclic, and heterocyclic radicals and in which any halogen substituents which may be present are attached directly to nuclear carbon atoms.

6. An insecticidal composition comprising as an active toxicant from 0.5 to 10 per cent by weight of a compound having the formula $$A-S-C_2H_4-O-C_2H_4-Cl$$

wherein A represents an aromatic radical of the benzene series and in which any halogen substituents which may be present are attached directly to nuclear carbon atoms.

GERALD H. COLEMAN.
CLARENCE L. MOYLE.